Sheet 1
3 Sheets
F. Nishwitz.
Mower.
No. 3496 Reissued Jun. 8, 1869.
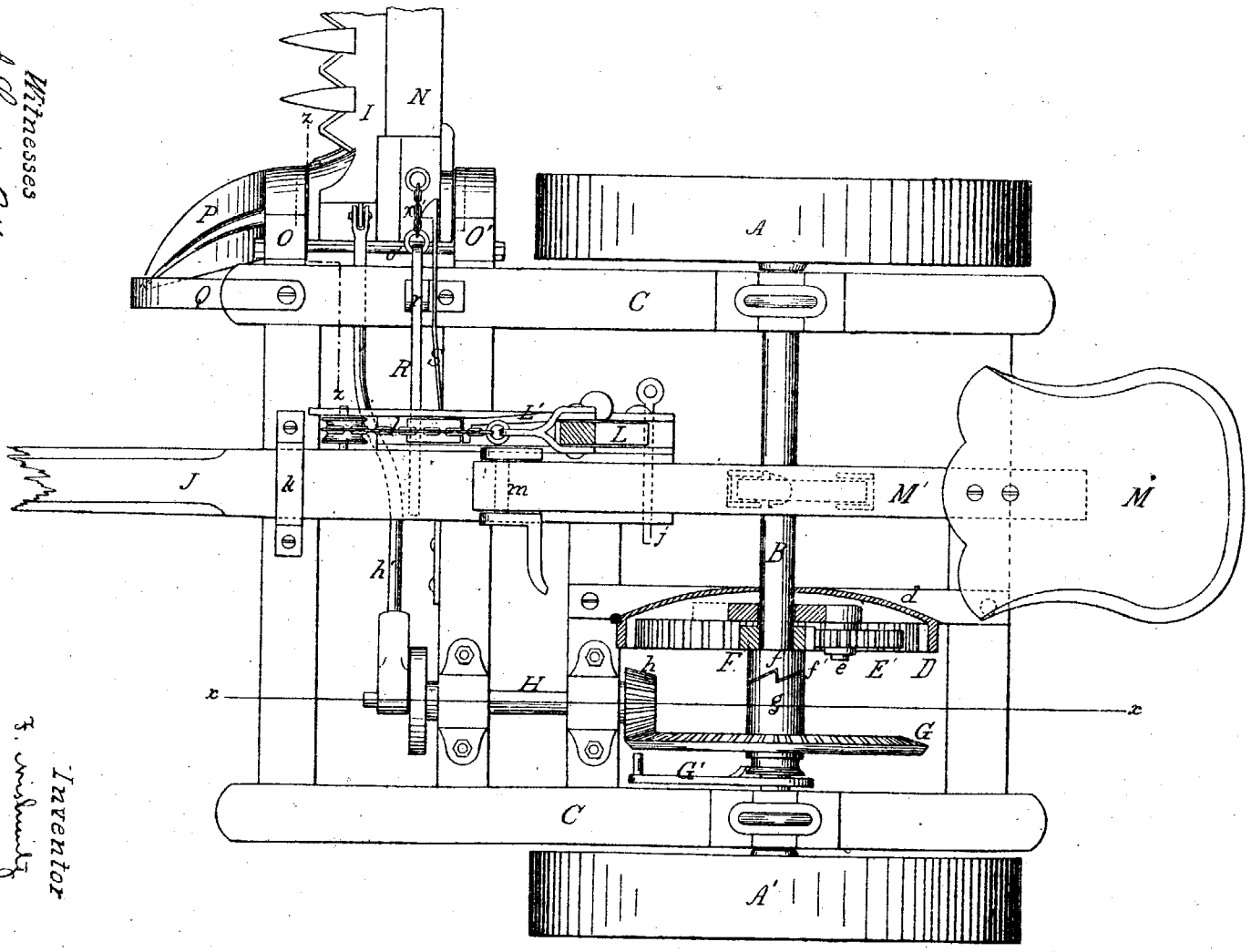
Witnesses
J. Snowden Bell.
John J. Chew.
Inventor
F. Nishwitz
by his Atty
Wm. D. Baldwin

F. Nishwitz.
Mower.
No 3496 Reissued Jun. 8, 1869.
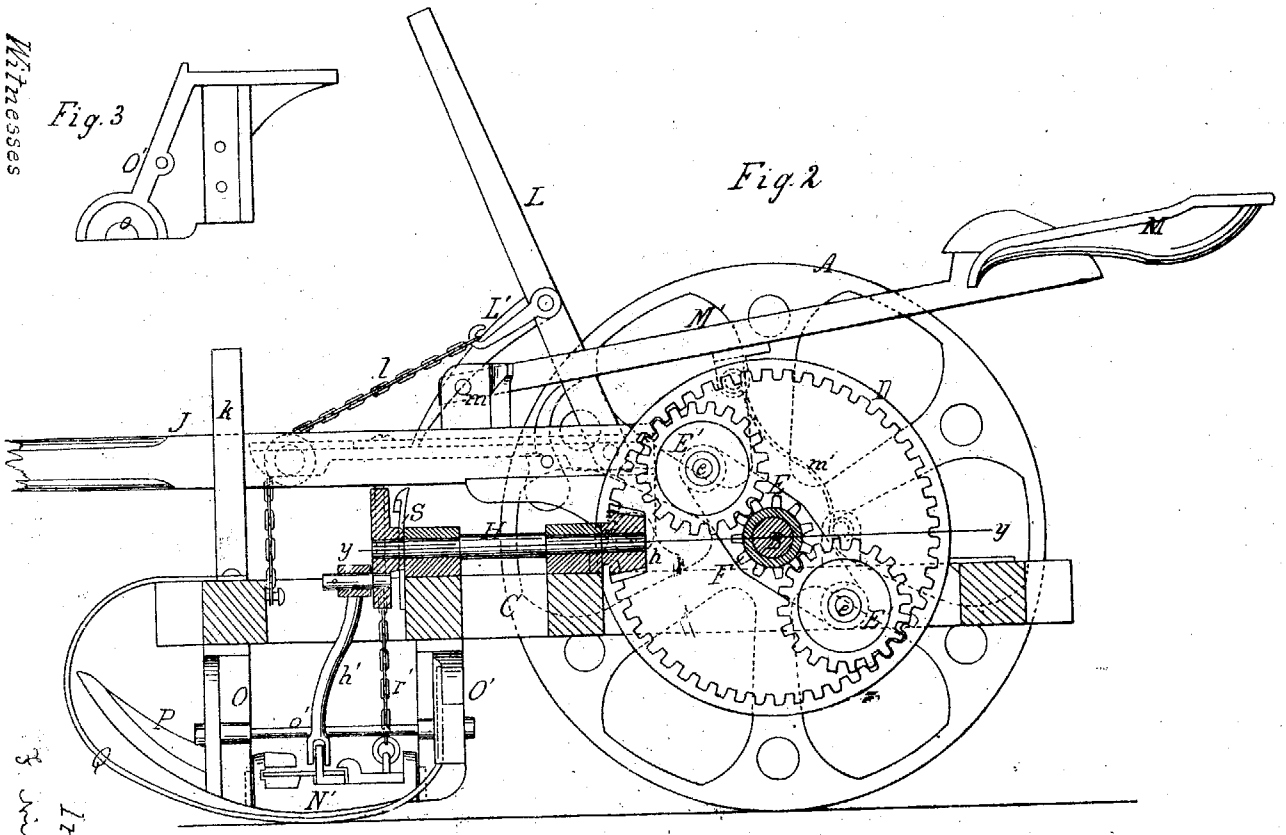
Witnesses
J. Snowden Bell
John J. Chew
Inventor
F. Nishwitz
by his Atty
Wm. D. Baldwin Sheet 3
3 Sheets
F. Nishwitz.
Mower.
No. 3496
Reissued Jun. 8, 1869
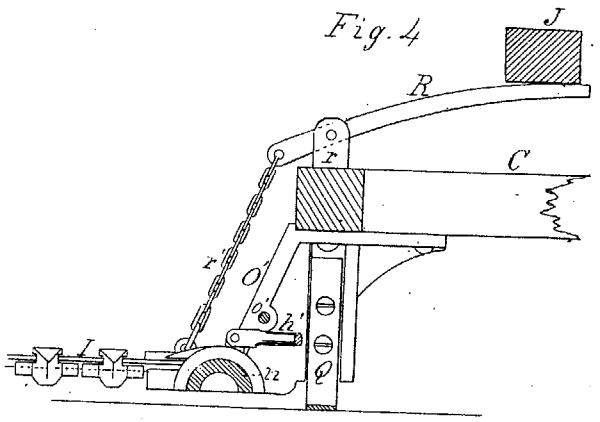
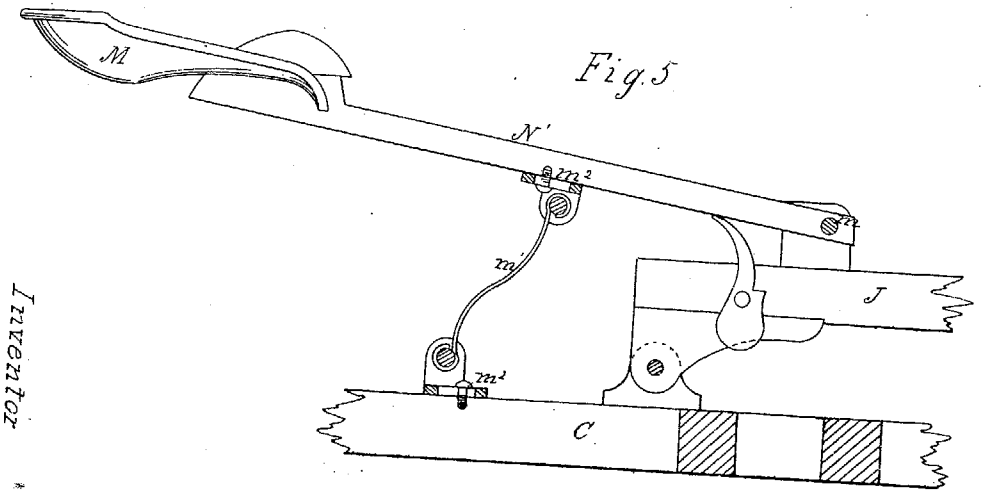
Witnesses
Joe J. Peyton
John J. Chew
Inventor
F. Nishwitz
by his Atty
Wm. D. Baldwin

UNITED STATES PATENT OFFICE.

F. NISHWITZ, OF BROOKLYN, NEW YORK.

IMPROVEMENT IN HARVESTERS.

Specification forming part of Letters Patent No. 46,488, dated February 21, 1865; Reissue No. 3,496, dated June 8, 1869.

DIVISION B.

*To all whom it may concern:*

Be it known that I, FREDERICK NISHWITZ, of Brooklyn, in the county of Kings and State of New York, have invented certain new and useful Improvements in Harvesters, of which the following is a full, clear, and exact description.

My invention relates to that class of harvesters having two driving and supporting wheels and a finger-beam hinged to the main frame.

The object of the first part of my invention is to lift the divider end of the finger-beam higher than its heel end, in order to pass obstructions with greater facility; and the improvement consists in a novel method of combining a lifting-lever, a vibrating tongue or draft-frame, a vibrating gear-frame, and a finger-beam hinged to the gear-frame with a vibrating tilting lever interposed between the two frames, and connected with the finger-beam by a flexible or jointed connection.

The object of the next part of my invention is to enable the driver to preserve the proper relation of his seat to the lifting-lever, notwithstanding the vibrations of the tongue and gearing-frame; and the improvement consists in a novel method of combining a vibrating gear-frame and a vibrating draft-frame with a driver's seat mounted on a supporting-bar pivoted on the draft-frame and connected with the gearing-frame by a pivoted link.

The improvement further consists in a novel method of combining a vibrating gear-frame, a vibrating tongue, and a vibrating driver's seat with a lifting-lever which vibrates the frame and driver's seat simultaneously.

The object of the next part of the invention is to balance the machine on its supporting-wheels; and the improvement consists in a novel method of combining a vibrating gear-frame and a vibrating tongue or draft-frame with a driver's seat supported partly on the tongue and partly on a link connected with the main frame, and adjustable backward or forward relatively to the axle, to adapt the machine to drivers of different weights.

The accompanying drawings represent all my improvements as embodied in a machine similar in its general outlines to the one shown and described in Letters Patent of the United States No. 19,377, granted to me on the 16th day of February, 1858.

Figure 1 represents a plan or top view of my improved machine. Fig. 2 represents a vertical longitudinal section through the machine at the line *x x* of Fig. 1, looking toward the divider side of the machine. Fig. 3 represents a view in elevation of the rear pendant detached, as seen from the front. Fig. 4 represents a vertical transverse section through the machine at the line *z z* of Fig. 1, looking toward the rear, and showing more particularly the method of lifting the divider end of the finger-beam. Fig. 5 is a view showing the driver's seat and its connections with the main frame and tongue.

In this instance the two driving-wheels A A′ are shown as mounted loosely on a common axle, B, with which they are connected by backing-ratchets of well-known construction. The axle B revolves loosely in suitable bearings on the gearing-frame C. An internally-geared spur-wheel, D, is secured upon a concave disk, *d*, fixed upon the gearing-frame in such manner that the spur-wheel D is concentric with the axle B. An arm, E, fixed upon, revolving with, and projecting on each side of the axle B, carries spur-pinions E′, revolving freely on pins *e*, and meshing on one side into the spur-wheel D, and on the other into a spur-pinion, F, fixed on a collar, *f*, turning freely on the main axle, and connected by a feather, *f′*, with a collar, *g*, also revolving loosely on the axle B, and carrying a bevel-wheel, G, driving a corresponding pinion, *h*, on a crank-shaft, H, which drives the cutters I by a crank and pitman, *h′*, in the usual way.

The mechanism is thrown into and out of gear by means of a shipping-lever, G′, provided with a cam-yoke fitting over a flange on the collar *g*. A tongue or draft-frame, J, is hinged to the main frame by a pivot, *j*, so as to vibrate freely vertically. A loop, K, on the front of the gearing-frame encompasses the tongue, acts as a stop to limit its descent below a given point, and sustains it against lateral strains, as in turning.

A lifting-lever, L, is pivoted on the tongue, and is connected with the forward end of the gearing-frame by a cord or chain, $l$, passing over a pulley on the tongue. A pawl, L′, pivoted on the hand-lever, takes into a ratchet-plate on the tongue and holds up the gearing-frame, as described in my patent of 1858, hereinbefore referred to.

A seat, M, for the driver is mounted on an inclined arm, M′, pivoted at $m$ to lugs on the draft-frame. This arm M′ is supported at a point intermediately between the pivot and the driver's seat by a link, $m'$, pivoted both to the bar and to the gear-frame behind the main axle, as shown by the dotted lines in Figs. 1 and 2. The pivots of the tongue, the inclined arm, and of the connecting-link thus form a sort of parallel-rule joint, which compensates for the vibrations of the tongue and gearing-frame, and enables the driver to maintain his proper relation to the lifting-lever, instead of his seat rocking backward and forward, as it would do if mounted directly upon the gearing-frame. As the seat is located behind the main axle, the weight of the driver tends both to lift the tongue and to depress the rear end of the gearing-frame, thus diminishing the pressure of the cutting apparatus on the ground, and causing the machine to run more lightly. The link $m^1$ is connected both with the arm M′ and with the frame by slots and set-screws $m^2$, as shown in Fig. 5, which permit it to be adjusted backward or forward, and thus balance the machine.

The finger-beam N is securely fastened to a socket, N′, provided with semicircular pivots $n$, fitting in sockets $o$ in pendants O O′, rigidly secured to the inner front corner of the gearing-frame, and connected by a clamping-bolt, $o'$. A metallic shoe, P, is firmly secured to, and projects in advance of, the front pendant O. The finger-beam is thus free to vibrate vertically on its pivots, while the shoe P is fixed. The finger-beam may likewise readily be detached from the main frame.

A supplementary guard-shoe, Q, composed of a flat bar of metal, is secured at its front end to the main frame and curved downward, and its rear end is secured to its rear pendant O′. As this shoe is slightly elastic, it relieves the pressure of the cutting apparatus upon the ground, and protects the pitman from being clogged by the cut crop; also prevents the cutters from falling out of the guards while the finger-beam is folded up.

A lever, R, is pivoted to vibrate vertically on a pivot, $r$, on the gear-frame. This lever is arranged in the same vertical plane as the finger-beam, is interposed between the tongue and the gearing-frame, and its outer end is connected by a chain, $r'$, with the finger-beam, at a point outside of its hinge. Consequently, when the gearing-frame is lifted by means of the hand-lever L, the tongue depresses the lever, and thus tips up the divider end of the cutting apparatus. The cutting apparatus may be folded up on its hinge until it rests against the main frame, in which position it may be held by a spring-hook, S. When thus folded up the entire cutting apparatus does not project beyond the outer face of the driving-wheel A, and the machine may, consequently, be driven through gates very little wider than the distance between the driving-wheels.

The operation of this machine being similar to other machines of this class, it is deemed unnecessary to describe it here.

What I claim as my invention is—

1. The combination of the main frame vibrating on the main axle, the tongue vibrating on the main frame, the finger-beam hinged to the main frame, and the lifting-lever mounted on the tongue, with the tilting-lever interposed between the tongue and gear-frame in the same vertical plane as the finger-beam, with which it is also connected by a chain attached outside of the pivot of the finger-beam, the whole being constructed for joint operation, as set forth.

2. The combination of a vibrating gear-frame and a vibrating draft-frame with a driver's seat, supported on the draft-frame and connected with the gearing-frame by a pivoted link.

3. The combination of a vibrating gear-frame, a vibrating tongue or draft-frame, and a vibrating driver's seat with a lifting-lever, L, the combination being and operating substantially as set forth.

4. The combination, substantially as set forth, of a vibrating tongue or draft-frame and a vibrating gear-frame with a driver's seat mounted on the tongue or draft-frame, and connected with the gear-frame by an adjustable pivoted link, for the purpose specified.

F. NISHWITZ.

Witnesses:
JOE I. PEYTON,
JOHN J. CHEW.